United States Patent
Ohseki et al.

(10) Patent No.: US 12,295,039 B2
(45) Date of Patent: May 6, 2025

(54) CONTROL APPARATUS SELECTIVELY USING PLURALITY OF ANTENNAS, CONTROL METHOD, AND COMPUTER-READABLE STORAGE MEDIUM

(71) Applicant: KDDI CORPORATION, Tokyo (JP)

(72) Inventors: Takeo Ohseki, Fujimino (JP); Masaaki Ito, Fujimino (JP); Issei Kanno, Fujimino (JP); Kosuke Yamazaki, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 247 days.

(21) Appl. No.: 17/737,679

(22) Filed: May 5, 2022

(65) Prior Publication Data

US 2022/0264656 A1    Aug. 18, 2022

Related U.S. Application Data (63) Continuation of application No. PCT/JP2020/031974, filed on Aug. 25, 2020.

(30) Foreign Application Priority Data

Nov. 12, 2019    (JP) .................................. 2019-204826

(51) Int. Cl.
H04W 74/0833    (2024.01)
H04B 7/06    (2006.01)
(Continued)

(52) U.S. Cl.
CPC ...... *H04W 74/0833* (2013.01); *H04B 7/0608* (2013.01); *H04B 7/0802* (2013.01); *H04L 5/0048* (2013.01)

(58) Field of Classification Search
None
See application file for complete search history.

(56) References Cited

U.S. PATENT DOCUMENTS 10,117,113 B2 *  10/2018  Braun ................... H04B 7/088
2015/0365157 A1   12/2015  Yang et al.
(Continued)

FOREIGN PATENT DOCUMENTS

CN    102237904 A    11/2011
EP    3 537 831 A1    9/2019
(Continued)

OTHER PUBLICATIONS

Ericsson, Sony, Verification of beam correspondence during initital access, 3GPP TSG RAN WG4 #92 R4-1908719, Aug. 26-30, 2019; 5 pages.

(Continued)

*Primary Examiner* — Xavier S Wong
(74) *Attorney, Agent, or Firm* — Foley & Lardner LLP (57) ABSTRACT

A control apparatus that is connected to a plurality of antennas and performs communication of user data with a terminal apparatus using at least one of the plurality of antennas, specifies a reception state of a random access preamble transmitted from the terminal apparatus for establishing connection with the control apparatus, at each of the plurality of antennas, selects an antenna to be used when performing communication of user data with the terminal apparatus, from the plurality of antennas based on the respective reception states at the plurality of antennas, and performs control such that communication of user data is performed with the terminal apparatus using the selected antenna.

11 Claims, 3 Drawing Sheets

(51) Int. Cl.
  *H04B 7/08* (2006.01)
  *H04L 5/00* (2006.01)

(56) References Cited

U.S. PATENT DOCUMENTS

| | | | | |
|---|---|---|---|---|
| 2016/0135227 A1* | 5/2016 | Hahn | ............. | H04W 24/02 |
| | | | | 370/329 |
| 2018/0212651 A1* | 7/2018 | Li | ............. | H04B 7/0686 |
| 2018/0359790 A1* | 12/2018 | Ingale | ............. | H04W 72/51 |
| 2019/0052334 A1* | 2/2019 | Jeon | ............. | H04J 11/0076 |

FOREIGN PATENT DOCUMENTS

| | | | |
|---|---|---|---|
| JP | 2005-151369 A | 6/2005 | |
| JP | 2008-048086 A | 2/2008 | |

OTHER PUBLICATIONS

International Search Report with English translation and Written Opinion mailed Nov. 10, 2020 corresponding International Application No. PCT/JP2020/031974; 10 pages.

Karlsson, et al., "Techniques for System Information Broadcast in Cell-Free Massive MIMO", IEEE Transaction on Communication, vol. 67, No. 1, Jan. 2019; 14 pages.

Office Action mailed Mar. 1, 2025 in Chinese Patent Application No. 202080077695.7, with English translation.

* cited by examiner

CONTROL APPARATUS SELECTIVELY USING PLURALITY OF ANTENNAS, CONTROL METHOD, AND COMPUTER-READABLE STORAGE MEDIUM

CROSS-REFERENCE TO RELATED APPLICATION(S)

This application is a continuation of International Patent Application No. PCT/JP2020/031974 filed on Aug. 25, 2020, which claims priority to and the benefit of Japanese Patent Application No. 2019-204826 filed on Nov. 12, 2019, the entire disclosures of which are incorporated herein by reference.

BACKGROUND OF THE INVENTION

Field of the Invention

The present invention relates to a control apparatus, control method, and a computer-readable storage medium, and specifically relates to a connection control technique in wireless communication.

Description of the Related Art

A technique is under study in which a plurality of antennas are arranged with high density, and communication with a terminal apparatus is performed using some of the plurality of antennas. With this technique, as a result of different antennas being used for each terminal apparatus, a cell is virtually configured for the terminal apparatus, and the terminal apparatus is approximately present at the center of the virtual cell (refer to M. Karlsson etc., "Techniques for System Information Broadcast in Cell-Free Massive MIMO", IEEE Transaction on Communication, January 2019). According to such a technique, the terminal apparatus can achieve uniform communication quality regardless of the position.

Any procedure for establishing connection has not been determined for performing communication between a terminal apparatus and a base station apparatus in an aforementioned system in which antennas are arranged with high density, and at least some of the antennas are selectively used. Therefore, it is requested to define a procedure for efficiently establishing connection between a base station apparatus and a terminal apparatus.

SUMMARY OF THE INVENTION

The present invention provides a technique for enabling efficient establishment of connection between a base station apparatus and a terminal apparatus, in a system in which some of a plurality of antennas are selected and used for performing communication between the base station apparatus and the terminal apparatus.

A control apparatus according to one aspect of the present invention is a control apparatus that is connected to a plurality of antennas and performs communication of user data with a terminal apparatus using at least one of the plurality of antennas, the control apparatus. The control apparatus performs controls so as to specify a reception state of a random access preamble transmitted from the terminal apparatus for establishing connection with the control apparatus, at each of the plurality of antennas, select an antenna to be used when performing communication of user data with the terminal apparatus, from the plurality of antennas based on the respective reception states at the plurality of antennas, and perform control such that communication of user data is performed with the terminal apparatus using the selected antenna.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

System Configuration

Figure 1:
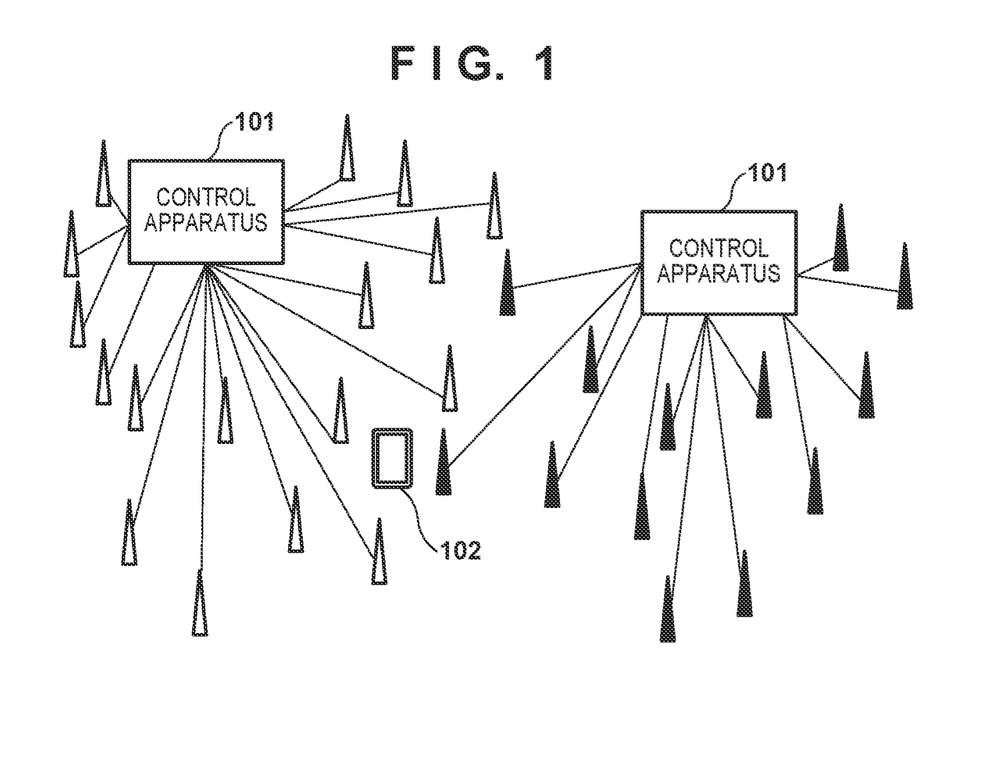
FIG. 1 is a diagram illustrating an exemplary configuration of a wireless communication system.

FIG. 1 shows an exemplary configuration of a wireless communication system according to a present embodiment. As shown in FIG. 1, in the wireless communication system according to the present embodiment, a plurality of antennas are planarly arranged with high density, and the antennas are connected to control apparatuses 101 such as base station apparatuses using optical fibers, for example. A control apparatuses 101 connects to a terminal apparatus 102 via at least one antenna and performs communication therewith. Note that, although only a small number of control apparatuses 101 and one terminal apparatus 102 are shown in FIG. 1 in order to simplify the description, there may be of course a larger number of these apparatuses than illustrated in FIG. 1.

Note that, in the following, description will be given assuming that the antennas are arranged in a distributed manner and are connected to the control apparatuses. However, only the antennas may be arranged with high density, or antenna units having an RF processing function such as an RF (radio frequency) filter may also be arranged with high density. The control apparatuses 101 execute communication processing other than the processing to be performed on the antenna side. That is, baseband processing regarding received signals and signal processing in an upper layer thereafter are performed by the control apparatuses 101. As shown in FIG. 1, when constructing a system in which a very large number of antennas are used, it is envisioned that a plurality of control apparatuses 101 are each connected to a plurality of antennas and perform signal transmission and reception, considering a computation load or the like. Note that this system can be configured using a known centralized radio access network (C-RAN), in which each antenna may correspond to a transmission/reception point (TRP) of C-RAN, and the control apparatus 101 may correspond to a baseband unit (BBU) of C-RAN.

The terminal apparatus 102 connects to a control apparatus 101 via an antenna that is present in the vicinity, and performs communication. The control apparatus 101 performs communication with the terminal apparatus 102 using at least some of the antennas that are connected to the control apparatus 101, in a state in which the connection with the terminal apparatus 102 has been established. Here, two or more control apparatuses 101 can establish connection with the terminal apparatus 102 and perform communication in parallel. Accordingly, one or more control apparatuses 101 can configure a virtual area with the terminal apparatus 102 being at the center (may also be referred to as a user centric area), and provide a high quality and highly stable communication service, regardless of the position of the terminal apparatus 102.

In contrast, any study has not been made regarding the processing that is performed when starting establishment of connection in such a system in which a plurality of antennas are used. In view of such a situation, the present embodiment provides a method to be used when the terminal apparatus 102 establishes initial connection with one or more control apparatuses 101. In particular, in the system as shown in FIG. 1, one or more control apparatuses 101 need to appropriately set antennas to be used with respect to each of one or more terminal apparatuses 102. Therefore, in the present embodiment, a method to be used by a control apparatus 101 to select an antenna to be used for communicating with a terminal apparatus 102 will be described. Note that, in the following, it is assumed that the terminal apparatus 102 establishes connection with the control apparatus 101 using a known random access procedure. Also, the random access procedure may be referred to as RACH.

First, a case will be examined in which a virtual area with the terminal apparatus 102 being at the center can be formed by one control apparatus 101. In this case, the terminal apparatus 102 sends out a random access preamble (that is included in a message A of a two-step RACH, or as a message 1 of a four-step RACH) using a parameter notified by a notification signal that has been sent out by the one control apparatus 101. Then, the one control apparatus 101 combines wireless signals respectively detected by the connected antennas, and detects the random access preamble based on the combined wireless signal. Note that the processing for detecting the random access preamble may be executed by detecting a correlation between the sequence used to transmit the random access preamble and the combined wireless signal. Also, the control apparatus 101 executes the procedure thereafter of the RACH processing, based on the success in detecting the random access preamble. With this, the connection between the control apparatus 101 and the terminal apparatus 102 is established. Thereafter, for example, the terminal apparatus 102 transmits a sounding reference signal (SRS), and the control apparatus 101 measures received power of the SRS at the antennas. Then, the control apparatus 101 may determine, from the connected antennas, antennas that satisfies criteria such as (1) a predetermined number of antennas in descending order of the SRS received power, (2) antennas whose SRS received power is a predetermined value or more, and (3) an antenna whose SRS received power is largest and antennas regarding which the difference in SRS timing from the SRS reception timing of this antenna is a predetermined value or less, as the antennas to be used to communicate with the terminal apparatus 102, for example. According to the criteria (1) and (2), antennas with which a preferable radio quality can be obtained with the terminal apparatus 102 are selected. Also, according to the criterion (3), an antenna that is arranged at a position sufficiently close to the terminal apparatus 102, and antennas whose distances from this antenna are considered to be in a given range are selected.

Also, when a virtual area with the terminal apparatus 102 being at the center is formed by a plurality of control apparatuses 101 in a cooperative manner, the terminal apparatus 102, first, establishes connection with one of the plurality of control apparatuses 101. Therefore, the terminal apparatus 102 sends out a random access preamble using a parameter notified by a notification signal that has been sent out by the one control apparatus 101, and establishes connection with the one control apparatus 101. Then, the one control apparatus 101 notifies the other control apparatuses in a surrounding area of the fact that the connection with the terminal apparatus 102 has been established, and causes the other control apparatuses to measure the SRS from the terminal apparatus 102. Then, the control apparatus 101 is notified of the results of measurement at antennas connected to the other control apparatuses, and the control apparatus 101 may select the antennas to be used for connection with the terminal apparatus 102 according to the criteria (1) to (3) described above. The selected antennas are notified to the other control apparatuses to which the selected antennas are connected. Also, in this case, the parameter to be used for communication with the terminal apparatus 102 may be notified to the other control apparatuses from the control apparatus 101. In this way, the antennas to be used may be appropriately set using the SRS for each terminal apparatus 102.

On the other hand, in the method described above, the antennas to be used are determined after having established connection. Therefore, a certain time elapses until user data communication can be started after connection is established. Also, in a situation in which the terminal apparatus 102 establishes connection with a plurality of control apparatuses 101, in particular, when the terminal apparatus 102 executes connection processing with one control apparatus 101, the antennas that are connected to the other control apparatuses 101 are not used for the connection processing. Therefore, the antennas that can be used while the connection processing is executed are restricted, and as a result, it may take time to detect a random access preamble.

Therefore, in order to reduce time it takes until user data communication can be started, the random access preamble transmitted by the terminal apparatus 102 is enabled to be used by the control apparatus 101 for antenna selection. The control apparatus 101 also detects, for each of the connected antennas, the received power when performing an operation to detect the random access preamble. For example, the control apparatus 101 executes processing for detecting the random access preamble using the wireless signal detected by each antenna, without combining the wireless signals detected by the antennas, and specifies the received power at the time of the processing. With this, the control apparatus 101 can specify the reception conditions of the random access preamble, with respect to each of the antennas connected to the control apparatus 101, such as what degree of intensity and what timing the wireless signal is received from the terminal apparatus 102. As a result, the control apparatus 101 can select antennas to be used for user data communication with the terminal apparatus 102 according to the criteria (1) to (3) described above, during the RACH process. That is, the control apparatus 101 may determine, from the connected antennas, antennas that satisfies criteria such as (1) a predetermined number of antennas in descending order of the received power of the random access preamble, (2) antennas whose received power of the random access preamble is a predetermined value or more, and (3) an antenna whose received power of the random access preamble is largest and antennas regarding which the difference in timing of the random access preamble from the random access preamble reception timing of this antenna is a predetermined value or less, as the antennas to be used to communicate with the terminal apparatus 102, for example.

Also, the control apparatus 101 provides, to the other control apparatuses, information for enabling detection of the random access preamble from the terminal apparatus 102, as needed, and enables detection of the random access preamble using the antennas connected to the other control apparatuses. Here, the information for enabling detection of the random access preamble is information that the terminal apparatus 102 uses when generating the random access preamble to be transmitted to the control apparatuses (base station apparatuses). The information for enabling detection of the random access preamble includes information regarding a seed for generating a sequence to be used in the random access preamble, and information for designating a time/frequency resource to be used when transmitting the random access preamble, for example. A control apparatus that has received this information specifies the time/frequency resource with which the random access preamble is to be waited for based on the information, and executes detection of the random access preamble based on the sequence generated based on the information regarding the seed, for example. Also, the control apparatus 101 acquires the random access preamble detection results at the antennas connected to the other control apparatuses from the other control apparatuses. Then, the control apparatus 101 selects antennas to be used for communication of user data with the terminal apparatus 102, from the antennas connected to the control apparatus 101 and the antennas connected to the other control apparatuses according to the criteria (1) to (3) described above or the like, based on the random access preamble detection result at the control apparatus 101 and the random access preamble detection results at the other control apparatuses. Then, if it is determined to use antennas connected to the other control apparatuses, the control apparatus 101 may notify the other control apparatuses associated with the selected antennas of the communication parameter in an upper layer or the like to be used for communication of user data. Here, identification information for identifying the selected antennas are notified to the other control apparatuses, for example. Also, a preamble ID for specifying the random access preamble may also be notified in order to enable specification of which terminal apparatus 102 the selected antennas are to be used to communicate with. Also, the control apparatus 101 and the other control apparatuses may perform transmission and reception of user data under the control of a yet another host apparatus. Also, a processing method after antennas are selected other than those may also be adopted.

Furthermore, the control apparatus 101 may acquire information for enabling detection of a random access preamble to be used when performing connection control with another control apparatus, from the other control apparatus, and be enabled to detect the random access preamble, as needed. Then, the control apparatus 101 performs detection processing of a random access preamble that the terminal apparatus 102 has transmitted for processing for connecting to the other control apparatus, for each antenna connected to the control apparatus 101, based on the received information, and transmits information regarding the received power and reception timing to the other control apparatus that has transmitted the information for enabling detection of the random access preamble. Thereafter, the other control apparatus determines the antennas to be used for transmission and reception of user data with the terminal apparatus 102, and notifies the control apparatus 101 of the determination result, as needed. Here as well, identification information of the selected antennas and a preamble ID of the random access preamble, as needed, are notified, for example. When any of antennas connected to the control apparatus 101 is determined to be used for transmission and reception of user data with the terminal apparatus 102, the control apparatus 101 executes transmission and reception of user data with the terminal apparatus 102 using the determined antenna.

Apparatus Configuration

Figure 2:
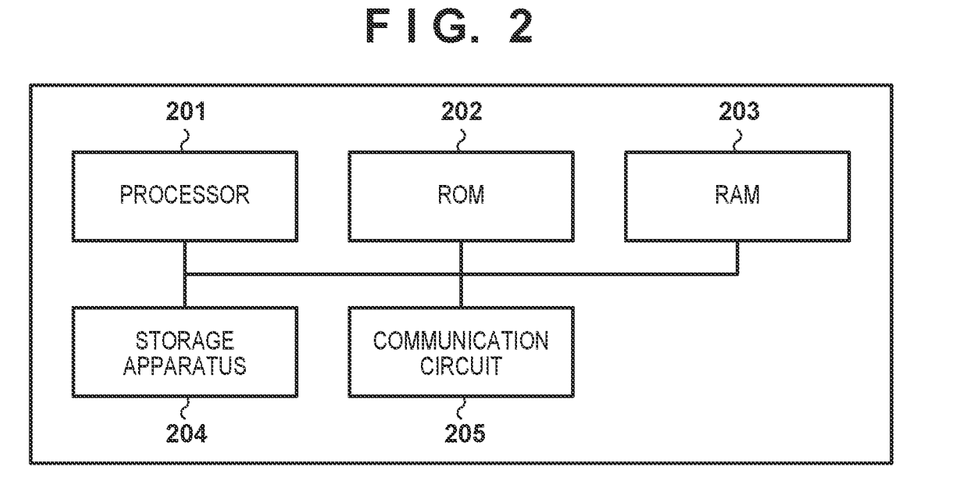
FIG. 2 is a diagram illustrating an exemplary hardware configuration of a control apparatus.

Next, the configuration of the control apparatus that executes processing described above will be described. Note that the terminal apparatus is similar to a known terminal apparatus that executes the RACH processing, and therefore the description here will be omitted. FIG. 2 shows an exemplary hardware configuration of the control apparatus. The control apparatus includes a processor 201, a ROM 202, a RAM 203, a storage apparatus 204, and a communication circuit 205, in one example. In the control apparatus, a computer readable program for realizing the functions of the control apparatus, which is recorded in any of the ROM 202, the RAM 203, and the storage apparatus 204, for example, is executed by the processor 201. Note that the processor 201 may be replaced by one or more processors such as an ASIC (application specific integrated circuit), an FPGA (field programmable gate array), and a DSP (digital signal processor).

The control apparatus performs communication with a partner apparatus (e.g., a terminal apparatus, another control apparatus, an upper node, or the like) by the processor 201 controlling the communication circuit 205, for example. Note that, a schematic diagram in which the control apparatus includes one communication circuit 205 is shown in FIG. 2, however there is no limitation thereto. For example, the control apparatus may include a communication apparatus for communicating with a terminal apparatus and a communication apparatus for communicating with another control apparatus or an upper node.

Figure 3:
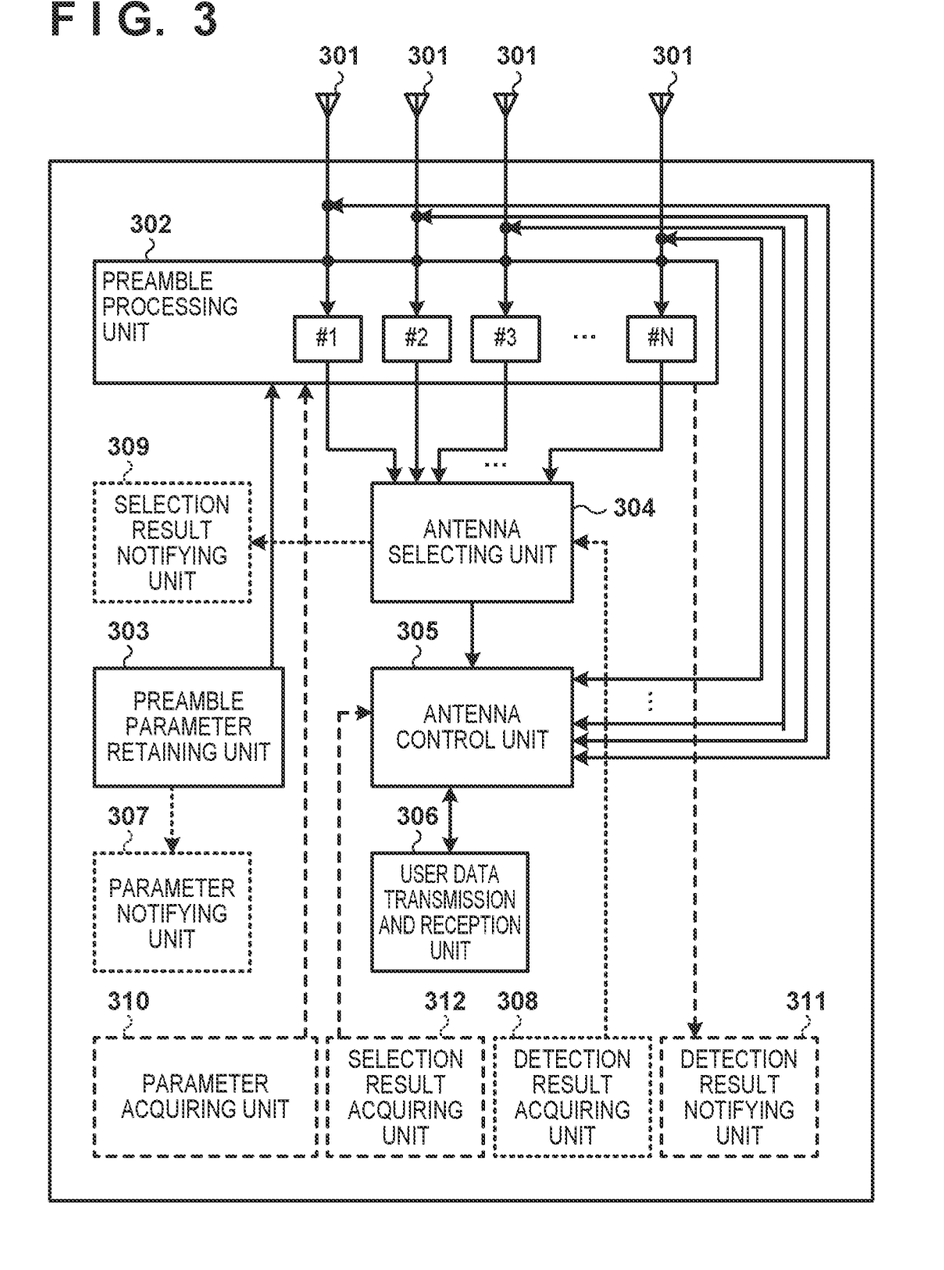
FIG. 3 is a diagram illustrating an exemplary functional configuration of the control apparatus.

FIG. 3 shows an exemplary functional configuration of the control apparatus. The functions shown in FIG. 3 are realized by the processor 201 of the control apparatus executing a program stored in the ROM 202, the RAM 203, and the storage apparatus 204, for example. Note that the control apparatus may include hardware corresponding to at least one of the later-described functions. Note that FIG. 3 is a diagram selectively showing functional units especially related to the present embodiment, of the functional units of the control apparatus, and the control apparatus of course includes functional units of a common base station apparatus.

The control apparatus is connected to a plurality of antennas 301, and includes a preamble processing unit 302 that executes detection processing of a random access preamble and measurement of received power/reception timing with respect to each of the wireless signals received by the plurality of antennas 301, respectively. The preamble processing unit 302 executes detection processing of a random access preamble and the like using a seed for generating the random access preamble to be used when a terminal apparatus establishes connection with the control apparatus and parameters related to the random access preamble such as a time/frequency resource with which the random access preamble is to be transmitted. In one example, the preamble processing unit 302 executes detection of the random access preamble and specification of received power, by executing correlation detection using the sequence specified based on the parameters, in the time/frequency resource designated by the parameters. Note that the parameters are retained by a preamble parameter retaining unit 303.

The received power and the reception timing of the random access preamble, at each of the plurality of antennas 301, that are specified by the preamble processing unit 302 are input to an antenna selecting unit 304. The antenna selecting unit 304 selects a predetermined number of antennas from the plurality of antennas 301 in descending order of the received power of the random access preamble, in one example. Also, the antenna selecting unit 304 selects antennas whose received power of the random access preamble is a predetermined value or more from the plurality of antennas 301. Note that if the number of antennas whose received power of the random access preamble is the predetermined value or more is a predetermined number or more, the predetermined number of antennas may be selected therefrom. Also, the antenna selecting unit 304 selects an antenna whose received power of the random access preamble is largest or one antenna whose received power is a predetermined value or more, and specifies a reception timing t1 of the random access preamble at the antenna. Also, the antenna selecting unit 304 specifies reception timings t2 of the random access preamble at the other antennas, and further selects antennas with respect to which the size |t1−t2| (|x| indicates an absolute value of a value x) is a predetermined value or less. Note that, if the number of antennas whose reception timing difference is the predetermined value or less is a predetermined number or more, antennas of the predetermined number may be selected in descending order of the received power of the random access preamble therefrom, for example. Also, if the number of antennas whose reception timing difference is the predetermined value or less is the predetermined number or more, antennas of the predetermined number may be selected in ascending order of the reception timing difference. Note that these selection criteria are examples, and antennas may be selected such that even if the terminal apparatus moves a given distance, the terminal apparatus can perform communication with sufficient radio quality. The selection result is input to an antenna control unit 305.

The antenna control unit 305 performs control such that at least some of the plurality of antennas 301 are used and the other antennas are not used, in order to communicate user data using the antennas selected by the antenna selecting unit 304. Then, a user data transmission and reception unit 306 communicates user data with the terminal apparatus using the antennas selected to be used, under the antenna control of the antenna control unit 305.

According to such a configuration, selection of antennas to be used for communicating user data is performed in parallel to the detection of the random access preamble, and therefore, communication of the user data becomes possible immediately after establishing connection between the terminal apparatus and the control apparatus.

Note that the control apparatus may include a parameter notifying unit 307, a detection result acquiring unit 308, and a selection result notifying unit 309, for example. The parameter notifying unit 307 notifies another control apparatus of the parameter of the random access preamble. In general, the other control apparatus does not have information regarding the random access preamble to be used when a control apparatus and a terminal apparatus that are in a neighboring relationship establish connection. Therefore, detection of the random access preamble transmitted by the terminal apparatus, specification of the received power, specification of the reception timing, and the like cannot be performed. Also, when such processing cannot be performed, selection of antennas to be used when performing communication of user data as described above cannot be performed. In contrast, the parameter notifying unit 307 notifies the other control apparatus of the parameter, and enables the other control apparatus to perform processing such as detection of the random access preamble addressed to the control apparatus. This parameter is a parameter similar to the parameter notified to terminal apparatuses by a notification signal, and may include a sequence seed of the random access preamble, information for specifying the time/frequency resource for transmitting the random access preamble, and the like, for example. The detection result acquiring unit 308 acquires information regarding the random access preamble detection result (received power and reception timing) based on the notified parameter from the other control apparatus, and inputs the acquired information to the antenna selecting unit 304. The information acquired here is information in which an antenna identifier is associated with a detection result, for example. Also, this information may further be associated with an ID of a preamble used when the detection result was obtained. Accordingly, this information is related to which of the terminal apparatuses can be specified.

The antenna selecting unit 304 determines an antenna to be used for communicating user data of the terminal apparatus based on the result of preamble detection by the preamble processing unit 302 and the acquired information. For example, when the random access preamble has been received with predetermined power or more at an antenna connected to another control apparatus, the antenna is determined to be used. Then, when an antenna connected to another control apparatus is selected, the selection result notifying unit 309 notifies the other control apparatus to which the selected antenna is connected of information indicating the antenna. The information notified here may be information in which a preamble ID is associated with antenna identification information.

Note that the configuration may be such that when a neighboring relationship is set between control apparatuses, and one control apparatus is registered in the neighboring cell list of the other control apparatus, the parameter notifying unit 307 may, only once, notify the other control apparatus of the parameter. Also, the parameter notifying unit 307 may notify the other control apparatus of the parameter every time the parameter is changed. Note that a configuration may be adopted in which the parameter in one control apparatus is notified to the other control apparatuses by another apparatus such as a host apparatus, and in this case, the control apparatuses acquire detection results in other control apparatuses without including the parameter notifying unit 307.

Also, a control apparatus may operate as another control apparatus described above. Therefore, the control apparatus may include a parameter acquiring unit 310, a detection result notifying unit 311, and a selection result acquiring unit 312, for example. The parameter acquiring unit 310 acquires, from the parameter notifying unit 307 of another control apparatus or another apparatus such as a host apparatus, a parameter regarding the random access preamble to be used when the other control apparatus establishes connection with a terminal apparatus. Then, the preamble processing unit 302 executes detection processing of the random access preamble from the terminal apparatus using the parameter, and the detection result notifying unit 311 notifies the other control apparatus of the processing result. Thereafter, the selection result acquiring unit 312 acquires information regarding the selected antenna from the other control apparatus, so that the selected antenna is to be used when communicating user data of the terminal apparatus, thereafter. Accordingly, when a plurality of control apparatuses communicate with a terminal apparatus in cooperation, antennas to be used can be appropriately selected.

Processing Flow

Figure 4:
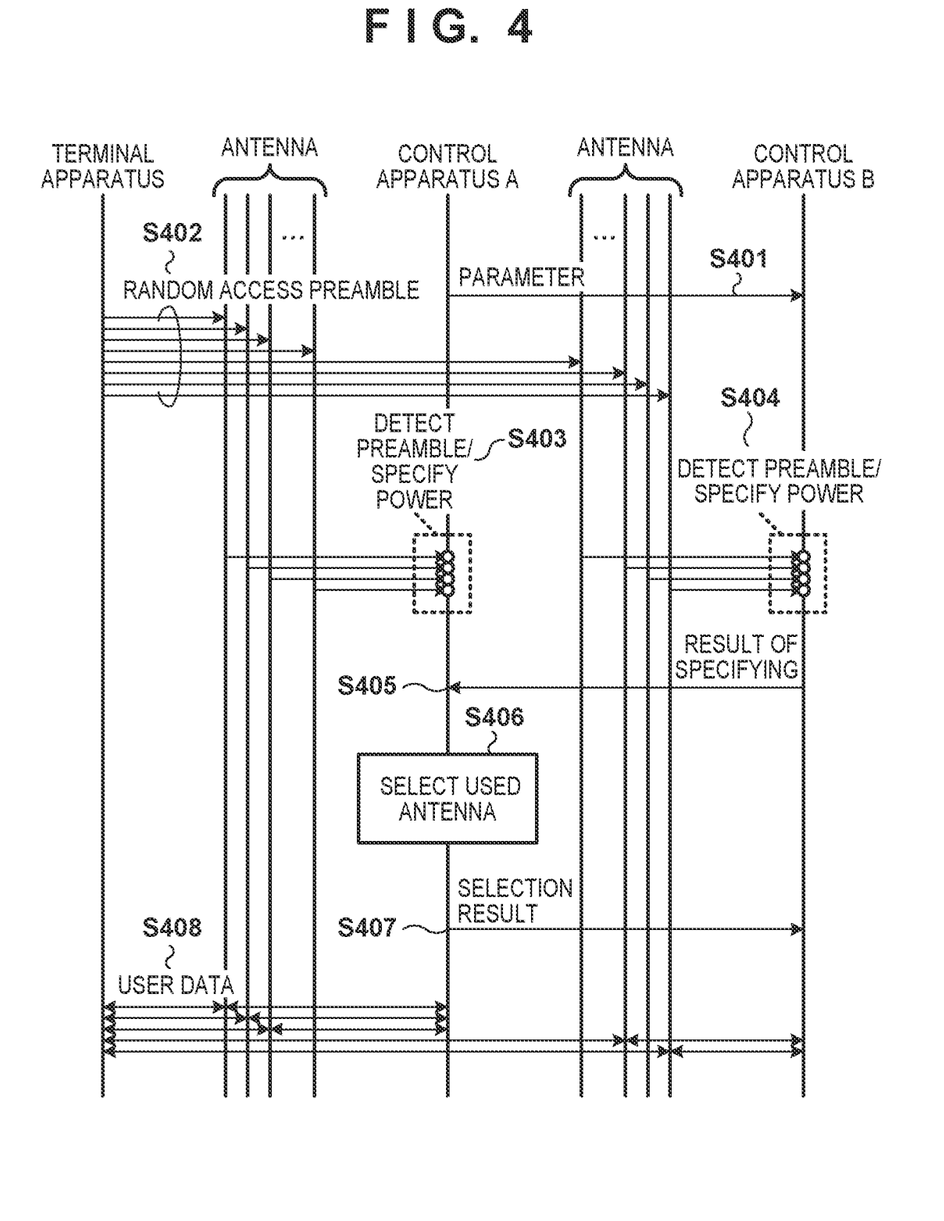
FIG. 4 is a diagram illustrating an example of a flow of processing to be executed in the wireless communication system.

Next, an outline of the processing flow to be executed in the wireless communication system according to the present embodiment will be described using FIG. 4. Note that description of the details of operations may be omitted regarding the operations described above. Here, a case where one terminal apparatus and two control apparatus are present, as shown in FIG. 1, will be described. The two control apparatuses (control apparatus A and control apparatus B) are each connected to a plurality of antennas, and are each configured to be able to communicate with the terminal apparatus via at least one of the antennas. Also, it is assumed that the two control apparatuses each have the functions of the control apparatus described above. Here, it is assumed that the terminal apparatus receives a notification signal from the control apparatus A, and attempts to establish connection with the control apparatus A. Note that the control apparatus A executes processing for transmitting a response message to the terminal apparatus in response to the random access preamble from the terminal apparatus and the like, in the RACH processing, but the description regarding such processing will be omitted, because the description of the processing is not directly related to the description of the invention.

In this processing, for example, the control apparatus A notifies, in response to establishment of a neighboring relationship with the control apparatus B or the like, the control apparatus B of a parameter regarding the random access preamble when establishing connection with the control apparatus A (S401). Upon receiving this parameter, the control apparatus B waits for arrival of the random access preamble based on the received parameter. Meanwhile, the terminal apparatus transmits the random access preamble for establishing connection with the control apparatus A (S402). The control apparatus A and the control apparatus B each execute processing for detecting the random access preamble and specifying the received power, the reception timing, and the like, with respect to each of the plurality of connected antennas (S403, S404). Note that the control apparatus B can detect the random access preamble transmitted by the terminal apparatus by using the parameter received in step S401. Thereafter, the control apparatus B notifies the control apparatus A of the result of specifying the received power and reception timing of the random access preamble (S405). The control apparatus B notifies the control apparatus A of information in which, regarding each antenna, the identification information of the antenna is associated with the specified received power and reception timing (and information for enabling specification of the terminal apparatus such as a preamble ID, as needed). Thereafter, the control apparatus A selects antennas to be used for communicating user data with the terminal apparatus based on the received power and reception timing of the random access preamble, with respect to each of the antennas connected to the control apparatus A and the received power and reception timing of the random access preamble, with respect to each of the antennas connected to the control apparatus B (S406). This selection is executed based on the selection criteria as described above, for example, but the description will not be repeated here. When selecting an antenna connected to the control apparatus B, the control apparatus A notifies the control apparatus B of the fact that the antenna has been selected (S407). Then, the control apparatus A and the control apparatus B perform transmission and reception of user data with the terminal apparatus using the selected antennas (S408).

As described above, according to the present embodiment, a control apparatus that is connected to a plurality of antennas and performs communication with a terminal apparatus using at least some of the antennas determines the antenna to be used for communicating user data, using the random access preamble transmitted from the terminal apparatus for establishing connection with the control apparatus. Accordingly, processing for determining an antenna to be used need not be executed separately after establishing connection. Therefore, a virtual area with the terminal apparatus being at the center can be quickly formed, and highly reliable communication of user data can be quickly started.

According to the present invention, connection between a base station apparatus and a terminal apparatus can be efficiently established, in a system in which some of a plurality of antennas are selected and used for performing communication between the base station apparatus and the terminal apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus that is connected to a plurality of antennas and performs communication of user data with a terminal apparatus using at least one of the plurality of antennas, the control apparatus comprising:

at least one processor; and at least one memory that stores a computer-readable instruction for causing, when executed by the at least one processor, the at least one processor to function as:

a specifying unit configured to specify a reception state of a random access preamble transmitted from the terminal apparatus for establishing connection with the control apparatus, at each of the plurality of antennas;

a first acquiring unit configured to acquire, from a second control apparatus, information indicating reception states of the random access preamble at a plurality of second antennas connected to the second control apparatus;

a selecting unit configured to select an antenna to be used when performing communication of user data with the terminal apparatus, from the plurality of antennas and the plurality of second antennas based on the respective reception states at the plurality of antennas and the reception states at the plurality of second antennas;

a first notifying unit configured to notify the second control apparatus of the antenna selected from the plurality of second antennas; and a control unit configured to perform control such that communication of user data is performed with the terminal apparatus using the selected antenna.

2. The control apparatus according to claim 1, further comprising:
a second notifying unit configured to notify the second control apparatus of a first parameter for enabling detection of the random access preamble,
wherein the first acquiring unit acquires information indicating reception states, at the plurality of second antennas, that the second control apparatus has specified based on the first parameter.

3. The control apparatus according to claim 1,
wherein the specifying unit specifies a reception state of a second random access preamble transmitted from another terminal apparatus for establishing connection with a third control apparatus at each of the plurality of antennas, and
the control apparatus further includes a third notifying unit configured to notify the third control apparatus of information indicating respective reception states of the second random access preamble at the plurality of antennas.

4. The control apparatus according to claim 3, further comprising:
a second acquiring unit configured to acquire a second parameter for enabling detection of the second random access preamble from the third control apparatus,
wherein the specifying unit specifies a reception state of the second random access preamble at each of the plurality of antennas based on the second parameter.

5. The control apparatus according to claim 3, further comprising:
a third acquiring unit configured to acquire, from the third control apparatus, information indicating the antenna selected by the third control apparatus from the plurality of antennas based on respective reception states of the second random access preamble at the plurality of antennas.

6. The control apparatus according to claim 1,
wherein the reception state is received power of a random access preamble, and
the selecting unit selects a predetermined number of antennas in descending order of the received power.

7. The control apparatus according to claim 1,
wherein the reception state is received power of a random access preamble, and
the selecting unit selects antennas whose received power exceeds a predetermined value.

8. The control apparatus according to claim 1,
wherein the reception state is received power and reception timing of a random access preamble, and
the selecting unit selects antennas regarding which the difference in reception timing from the reception timing at one antenna whose received power of a random access preamble is largest or exceeds a predetermined value is a predetermined value or less.

9. The control apparatus according to claim 1, wherein the control apparatus is a base station apparatus.

10. A control method that is executed by a control apparatus that is connected to a plurality of antennas and performs communication of user data with a terminal apparatus using at least one of the plurality of antennas, the control method comprising:
specifying a reception state of a random access preamble transmitted from the terminal apparatus for establishing connection with the control apparatus, at each of the plurality of antennas;
acquiring, from a second control apparatus, information indicating reception states of the random access preamble at a plurality of second antennas connected to the second control apparatus;
selecting an antenna to be used when performing communication of user data with the terminal apparatus, from the plurality of antennas and the plurality of second antennas based on the respective reception states at the plurality of antennas and the reception states at the plurality of second antennas;
notifying the second control apparatus of the antenna selected from the plurality of second antennas; and
performing control such that communication of user data is performed with the terminal apparatus using the selected antenna.

11. A non-transitory computer-readable storage medium that stores a program for causing a computer included in a control apparatus that is connected to a plurality of antennas and performs communication of user data with a terminal apparatus using at least one of the plurality of antennas to carry out:
specifying a reception state of a random access preamble transmitted from the terminal apparatus for establishing connection with the control apparatus, at each of the plurality of antennas;
acquiring, from a second control apparatus, information indicating reception states of the random access preamble at a plurality of second antennas connected to the second control apparatus;
selecting an antenna to be used when performing communication of user data with the terminal apparatus, from the plurality of antennas and the plurality of second antennas based on the respective reception states at the plurality of antennas and the reception states at the plurality of second antennas;
notifying the second control apparatus of the antenna selected from the plurality of second antennas; and
performing control such that communication of user data is performed with the terminal apparatus using the selected antenna.

\* \* \* \* \*